United States Patent [19]
Tinelli et al.

[11] Patent Number: 5,565,013
[45] Date of Patent: Oct. 15, 1996

[54] EXTENSIBLE KNITTED METAL FABRIC COVERING FOR CONVEYOR ROLLERS IN A GLASS HEATING FURNACE

[75] Inventors: Pascal Tinelli, Compiegne; Jean-Luc Lesage, Margny les Compiegne, both of France

[73] Assignee: Saint-Gobain Vitrage International, Courbevoie, France

[21] Appl. No.: 354,271

[22] Filed: Dec. 12, 1994

Related U.S. Application Data

[63] Continuation of Ser. No. 912,757, Jul. 13, 1992, abandoned.

[30] Foreign Application Priority Data

Jul. 11, 1991 [FR] France ................................. 91 08720

[51] Int. Cl.$^6$ .................................................. C03B 13/16
[52] U.S. Cl. .............................. 65/370.1; 65/289; 65/118
[58] Field of Search ................................................. 65/118

[56] References Cited

U.S. PATENT DOCUMENTS

| | | |
|---|---|---|
| 3,807,013 | 4/1974 | Sukenik . |
| 3,815,197 | 6/1974 | Sukenik ................................. 29/132 |
| 3,852,862 | 12/1974 | Sukenik . |
| 4,753,669 | 6/1988 | Reese ........................................ 65/273 |
| 4,906,271 | 3/1991 | D'Iribarne et al. .................. 65/374.12 |
| 5,236,487 | 8/1993 | Letemps et al. ........................... 65/273 |

FOREIGN PATENT DOCUMENTS

| | | |
|---|---|---|
| 107565 | 5/1984 | European Pat. Off. . |
| 94427 | 2/1970 | France . |
| 2134218 | 8/1984 | United Kingdom . |
| 2186270 | 8/1987 | United Kingdom . |

OTHER PUBLICATIONS

World Patents Index Latest, Section Ch, Derwent Publications Ltd., London, GB; Class L, AN 86–248250 and JP–61175311 (Kubota KK) Aug. 17, 1986.

*Primary Examiner*—Donald E. Czaja
*Assistant Examiner*—Calvin Padgett
*Attorney, Agent, or Firm*—Oblon, Spivak, McClelland, Maier & Neustadt, P.C.

[57] ABSTRACT

Tubular coverings for conveyor rollers for glass sheets heated to the softening point in a bending and/or heat treatment furnace, which have the special feature of having an outer surface, i.e. the surface that contacts the glass sheets, which is based on metal wires exhibit a reduced risk of marking the glass sheets and also exhibit a high temperature and wear resistance. Such tubular coverings are preferably used for covering the rollers present in the frontal and/or lateral positioning zones of the glass sheets on the conveyor.

13 Claims, 1 Drawing Sheet

EXTENSIBLE KNITTED METAL FABRIC COVERING FOR CONVEYOR ROLLERS IN A GLASS HEATING FURNACE

This application is a Continuation of application Ser. No. 07/912,757, filed on Jul. 13, 1992, now abandoned.

FIELD OF THE INVENTION

The present invention relates to the bending and/or heat treatment of glass sheets. The present invention also relates to a covering for conveyor rollers which convey glass sheets through a horizontal furnace in order to heat the glass sheets to the temperature necessary for their bending and/or subsequent heat treatment. The present invention more specifically relates to the use of coverings for rollers located in the areas for repositioning the sheets relative to their travel axis. The present invention further relates to a furnace which contains such roller coverings and a method of heating glass in such a furnace.

DISCUSSION OF THE BACKGROUND

For producing bent glass sheets having a good principal curvature conformity and a satisfactory optical quality, it is important that the glass sheet is correctly positioned before being taken up by the bending and/or heat treatment tools. This is why there are usually glass sheet orientation readjustments within the furnace in the plane of the conveyor rollers and normally frontally, i.e. acting on the "leading" edge of the sheet with respect to its travel axis and/or laterally, i.e. by acting on one or other of the edges substantially parallel to said axis. The nearer said readjustment takes place at the end of the furnace, the more it is effective, because the risk of any further disorientation of the sheets before being taken up on leaving the furnace is more greatly reduced. However, such a 'tardy' readjustment significantly increases the risk of the sheets being marked when very close to their final softening point, because it involves both a direct contact between the repositioning members and one or more edges of the sheets and a friction between the lower surface of the sheets and the conveyor rollers.

There are two types of repositioning members, namely "static" and "dynamic" members.

Firstly, EP-A-389 317 discloses an apparatus which can be referred to as "static", which has frontal abutments, e.g. two such abutments, interposed on the path of the glass sheets in the furnace and which when successively struck by the leading edge of each of them, retract as soon as the double contact between the sheet and the two abutments is detected. Thus, the repositioning time is reduced to that strictly necessary, in order to limit the glass/roller friction time. However, by stopping the sheet, this type of static apparatus induces frictions which, even if acceptable up to the center of the furnace, i.e. at a glass temperature below 500° to 550° C., would produce marks on the lower surface of the glass sheets at positions in the furnace beyond this and at higher glass temperatures.

Thus, another type of repositioning member has been proposed and which is referred to as "dynamic", to the extent that such members perform a movement and accompany each sheet over a certain distance whilst reorienting it. Reference can be made in this connection to the frontal recentering apparatus of EP-A-389 316 and the lateral repositioning apparatus of EP-A-367 670. This makes it possible to allow high production rates, whilst simultaneously significantly reducing the intensity of the friction between the glass at the rollers, there being a reduced speed difference during repositioning between the sheets and the rollers, which have a constant rotation speed. Therefore such a dynamic apparatus can be used right up to the end of the furnace.

However, although it has good performance characteristics, it is relatively expensive and has a complex construction, because it requires a detection of the sheets upstream thereof, a good synchronization between the movement of the successive sheets and that of the repositioning members, as well as a systematic regulation between each production series of bent glass sheets. Its use also makes it necessary to reserve within the furnace an area allowing the movement of such a moving member, while having openings therein which are inappropriate for regulating the temperature of the furnace enclosure.

The aim of the present invention is therefore to permit the use of the much simpler static repositioning apparatuses all along the furnace, but without causing any marking on the glass sheets so as to cause any deterioration in their optical quality.

The inventors have found that any frontal repositioning stops or at least decelerates the glass sheet, whereas the rollers continue to rotate in a uniform manner and any lateral repositioning leads to the skidding thereof on the rollers with respect to its travel axis. As stated hereinbefore, this friction increases when using static apparatuses and on approaching the furnace outlet.

Up to now, a conventional means for minimizing such friction was to cover the rollers located in the repositioning area with braided silica wire sheaths. However, their use is not completely satisfactory for several reasons.

Firstly, these silica wires oxidize relatively rapidly at high temperature, even when located at the start or in the center of the furnace. In addition, such sheaths have a mediocre mechanical strength, which frequently leads to local breakages of a few wires and these are propagated very rapidly over the entire sheath length, so that locally the glass sheet rests on a bare roller. As a result, it is necessary to replace the sheaths very frequently. Further, the braided texture of the sheaths, which is similar to a fabric, offers a smooth surface, but has a rather limited "softness" in its thickness. Therefore contact between the glass and silica is not of an optimum nature.

Thus, there remains a need for coverings for conveyor rollers in a glass heat-treatment furnace which are free of the above-described drawbacks. There also remains a need for a glass heat-treatment furnace which contains rollers covered with such coverings and a method for heating glass utilizing such a furnace.

SUMMARY OF THE INVENTION

Accordingly, it is one object of the present invention to provide coverings for conveyor rollers in a glass heat-treatment furnace.

It is another object of the present invention to provide coverings for conveyor rollers in a glass heat-treatment furnace, which exhibit a low coefficient of friction with glass.

It is another object of the present invention to provide coverings for conveyor rollers in a glass heat-treatment furnace, which exhibit a high temperature resistance and a high mechanical strength.

It is another object of the present invention to provide coverings for conveyor rollers in a glass heat-treatment furnace, which exhibit a long lifetime.

It is another object of the present invention to provide a glass heat-treatment furnace which comprises conveyor rollers which are covered with such a covering.

It is another object of the present invention to provide a method of heating glass utilizing such a furnace.

These and other objects, which will become apparent during the following detailed description, have been achieved by another type of roller covering making it possible to adequately reduce the intensity of friction between the glass and rollers, particularly in the repositioning areas, while using apparatuses of the static type, so as to be able to use static type devices at the end of the furnace and while obviating the disadvantages of the silica covering referred to hereinbefore.

These coverings comprise a tubular covering for conveyor rollers for glass sheets brought to their softening point temperature into a bending and/or heat treatment furnace, which has the special feature of an outer surface, i.e. that in contact with the glass sheets, which consists essentially of metal wires. It can therefore, e.g., be formed from metal wires over its entire thickness and can in fact be entirely metallic.

Within the scope of the present invention, the present coverings are used for equipping the rollers located in the frontal and/or lateral repositioning zones of the glass sheets in the plane of the conveyor relative to the travel axis thereof.

The invention also relates to the association of a group of conveyor rollers in the furnace equipped with such a covering and repositioning members. The present invention also includes a furnace comprising conveyor rollers equipped with the present covering and a method of heating glass utilizing such a furnace.

Thus, the contact between the glass and the metal induces a friction coefficient which is much lower than a glass-silica contact, which leads to a significant reduction in the marking risks of the lower surfaces of the sheets during their repositioning.

BRIEF DESCRIPTION OF THE DRAWINGS

A more complete appreciation of the invention and many of the attendant advantages thereof will be readily obtained as the same becomes better understood by reference to the following detail description when considered in connection with the accompanying drawings, wherein.

DETAILED DESCRIPTION OF THE PREFERRED EMBODIMENTS

Figure 1:
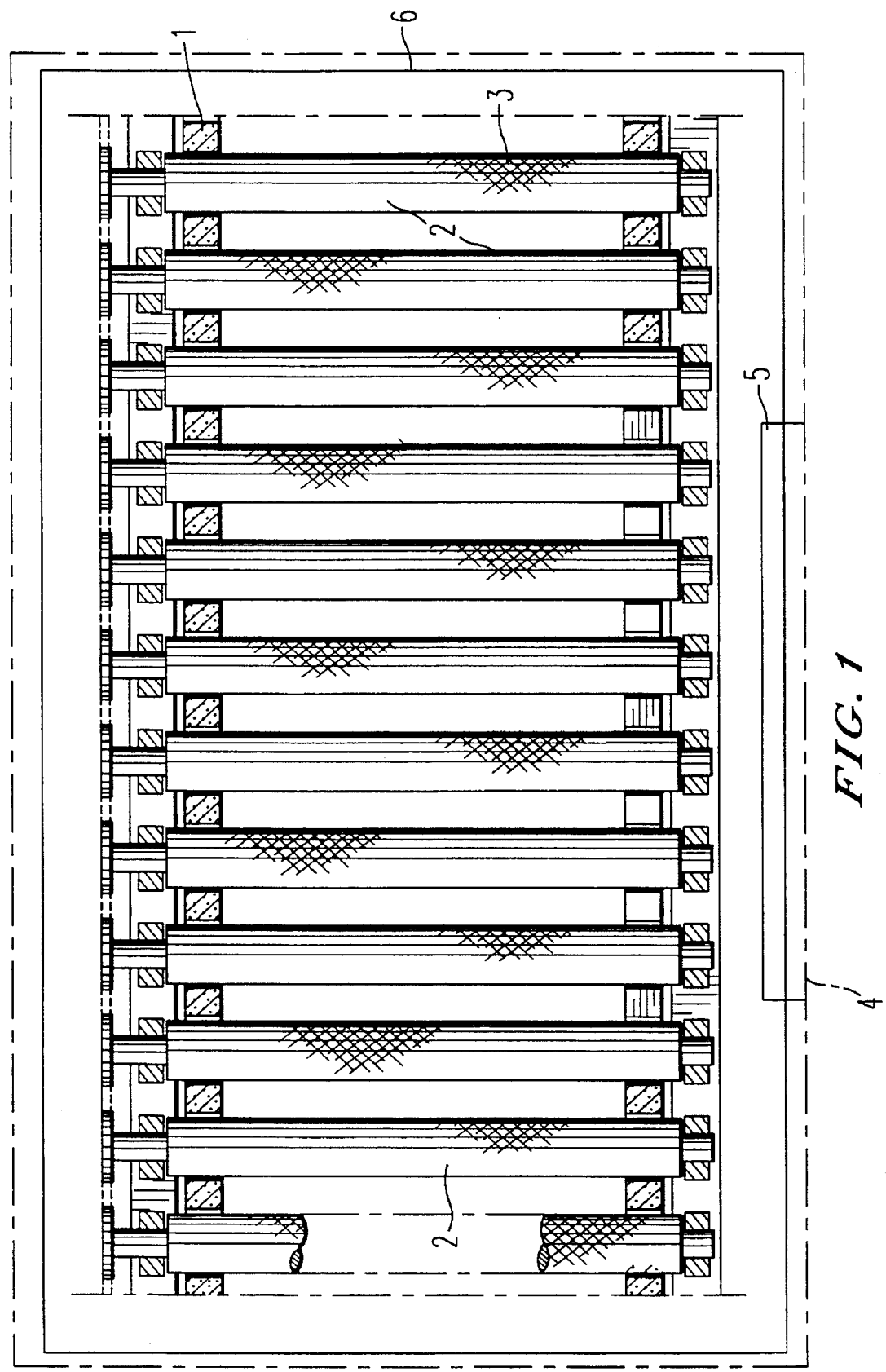
FIG. 1 shows a conveying means (1) comprising conveying rollers (2), said conveying rollers being covered with a covering (3) of an extensible fabric of knitted metal wires and said conveying means being located in a heat treatment furnace (4), containing a heating means (5). The conveying rollers are located in a repositioning zone (6).

Preference is given to the choice of a covering based on metal wires, such as stainless steel, nickel-chromium or iron-chromium-nickel wires, said covering then having a high temperature resistance and a mechanical strength much greater than those of a silica covering. The wires do not suddenly break, and wear is greatly decelerated and is much more progressive, which makes it possible to replace the coverings much less frequently.

The texture of the metal covering is either braided or knitted. However, a knitted structure is preferred because, as a result of its flexibility and softness, it favors a gentle contact with the glass, which helps to reduce marking risks.

Moreover, the extensibility of said tubular knitted fabric, particularly along the axes perpendicular to the axis of the cylinder forming the covering, enables it to adapt to different roller diameters.

The characteristics and advantages of the invention will become more apparent from the following detailed description of non-limitative embodiments.

For characterizing a wire which can be braided or knitted, use is made of the metric number, which indicates the number of linear meters obtained for one gram of material. Within the scope of the invention, the metric number of the wires used is preferably between 5 and 50.

A tubular covering in the case of a knitted fabric is produced on a cylindrical knitting machine having a certain number of needles per inch. This makes it possible to evaluate the size of the meshes of the knitted fabric obtained. In the present coverings, the mesh is preferably between 12 and 20. The knitted fabric has relatively extensible meshes, netably a weft knitted fabric.

The metal wires are advantageously constituted by twisted fibres, which are themselves formed from unitary filaments having a mean diameter between 7 and 12 microns. These wires are in particular made from an alloy essentially based on nickel and chromium, such as the alloy 316L according to the AISI standard, or iron-chromium-nickel alloy, such as the stainless steel Inconel 601 according to the ASTM standard. The latter, which has a better high temperature behavior than the former, is preferred in the case where the repositioning area of the glass sheets is at the end of the furnace and where the sheet temperature exceeds 650° C.

The covering thickness is preferably 1 to 2 mm.

Tubular metal knitted coverings especially suitable for the application envisaged by the present invention are marketed by Bekaert Company under the name Bekitherm KN/T2/316L and are formed from a 316L alloy, together with its homolog based on the Inconel 601 alloy and called Bekitherm KN/T2/INC.601. Both have a nominal thickness of 1.5 m and a weight per unit length of the wires in g/m, of 135. Their internal diameters, when not under tension, are respectively 40 and 50 mm. They are usable for conveyor rollers respectively having external diameters of 40 to 80 and 50 to 90 mm.

Thus, the metal coverings equip the number of rollers adequate for ensuring the contact with the surface of the glass sheet along its repositioning path. They make it possible to considerably reduce any marking risk due to the inevitable friction between the glass and the rollers resulting from even an optimum sheet repositioning and are also very stable.

Their presence is particularly advantageous when using static repositioning members, i.e. those which are most likely to produce marks on the glass sheet, because they can be used even at the end of the furnace where the temperature is highest, due to the reduction in the intensity of the friction caused by a metal surface, which could not hitherto be envisaged. It is therefore unnecessary to use the more complex "dynamic" apparatuses, when they are not indispensable. However, it is obvious that it is possible to use this covering with advantage a fortiori in the case of dynamic repositioning apparatuses.

Reference should be made to the three aforementioned patents for further information on each of these apparatuses, but it is clear that the covering according to the present invention is suitable for any repositioning area within the furnace, no matter what the repositioning member and in general for any area where marking is possible as a result of contact with the rollers.

With the contact quality with the glass and the softness provided by such a covering whose external surface consists essentially of metal wires, it can be used for equipping rollers located at any area within the furnace for the conveying of the sheets.

Moreover, its very considerable stability makes it useful for covering rollers in the most sensitive areas to wear, e.g. at the top of the furnace where the glass volume starts, under the action of heating, to slightly deform and in particular assume a "boat" shape (i.e a transversely slightly curved shape), whose edges act strongly on the covering of the rollers at said location.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the U.S. is:

1. A plurality of conveyor rollers on which glass sheets travel, wherein each roller of said rollers has a tubular covering, the outer surface of said covering consisting essentially of an extensible fabric of knitted metal wires, wherein said metal wires comprise fibers, wherein said fibers comprise filaments, and wherein said filaments have a mean diameter between 7 and 12 microns.

2. The plurality of rollers according to claim 1, wherein the entire covering consists essentially of metal wires.

3. The plurality of rollers according to claim 1, wherein said metal wires consist essentially of metal alloy wires, selected from the group consisting of stainless steel, alloys based on nickel and chromium, and alloys based on iron-nickel-chromium.

4. The plurality of rollers according to claim 3, wherein said wires comprise twisted fibers, and said twisted fibers comprise filaments having a mean diameter between 7 and 12 microns.

5. The plurality of rollers according to claim 3, wherein said covering is in the form of a weft knitted fabric with an extensible character and having a mesh size between 12 and 20.

6. The plurality of rollers according to claim 1, wherein said covering has a thickness between 1 and 2 mm.

7. A glass sheet heat-treatment furnace, comprising means for heat-treating glass sheets and glass sheet conveying means, wherein said conveying means comprises conveyor rollers covered with a covering having an outer surface which consists essentially of an extensible fabric of knitted metal wires, wherein said metal wires comprise fibers, wherein said fibers comprise filaments, wherein said filaments have a mean diameter between 7 and 12 microns, wherein said conveyor rollers are located in a repositioning zone inside said furnace, and wherein said repositioning zone comprises repositioning members.

8. The furnace of claim 7, wherein the entire covering consists essentially of metal wires.

9. The furnace of claim 7, wherein said metal wires consist essentially of metal alloy wires, selected from the group consisting of stainless steel, alloys based on nickel and chromium, and alloys based on iron-nickel-chromium.

10. The furnace of claim 9, wherein said wires comprise twisted fibers, and said twisted fibers comprise filaments having a mean diameter between 7 and 12 microns.

11. The furnace of claim 9, wherein said covering is in the form of a weft knitted fabric with an extensible character and having a mesh size between 12 and 20.

12. The furnace of claim 9, wherein said covering has a thickness between 1 and 2 mm.

13. A method of heating glass sheets, comprising conveying the glass sheets through a furnace having heating means and conveying means, wherein said conveying means comprises conveyor rollers covered with a covering having an outer surface which consists essentially of an extensible fabric of knitted metal wires, wherein said metal wires comprise fibers, wherein said fibers comprise filaments, wherein said filaments have a mean diameter between 7 and 12 microns, wherein said conveyor rollers are located in a repositioning zone inside said furnace, and wherein said repositioning zone comprises repositioning members.

* * * * *